US008819822B1

(12) United States Patent
Pike et al.

(10) Patent No.: US 8,819,822 B1
(45) Date of Patent: Aug. 26, 2014

(54) SECURITY METHOD FOR DETECTING INTRUSIONS THAT EXPLOIT MISINTERPRETATION OF SUPPLIED DATA (75) Inventors: Geoffrey Pike, San Francisco, CA (US); Edward N. Leake, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 1949 days.

(21) Appl. No.: 11/395,817

(22) Filed: Mar. 30, 2006

(51) Int. Cl.
*G06F 21/00* (2013.01)

(52) U.S. Cl.
USPC .................................. 726/23; 726/22; 726/24

(58) Field of Classification Search
USPC ......... 726/22, 23, 24; 713/150–181, 187, 188
See application file for complete search history.

(56) References Cited

U.S. PATENT DOCUMENTS

| 7,555,777 | B2 * | 6/2009 | Swimmer et al. | 726/23 |
| 2004/0107361 | A1 * | 6/2004 | Redan et al. | 713/201 |
| 2005/0283838 | A1 * | 12/2005 | Saito | 726/24 |
| 2006/0031933 | A1 * | 2/2006 | Costa et al. | 726/22 |

OTHER PUBLICATIONS

Determina™ Inc. "How the Memory Firewall™ Works" White Paper, Copyright 2003-2005 Determina, Inc., pp. 1-14, www.determina.com.
Determina™ Inc. "Determina VPS™ Technology Overview" White Paper, Copyright 2003-2005 Determina, Inc., pp. 1-11, www.determina.com.
Abadi, "Control-Flow Integrity", Proceedings of the 12th ACM conference on Computer and communications security, 2005, pp. 340-353, ACM Press, New York.
Bulba and KIL3R, "Bypassing StackGuard and StackShield", Phrack Magazine, vol. 10 [0xa] Issue 56 [0x38] (May 2000), archived online at http://www.phrack.org/phrack/56/p56-0x05.
Cowan, "StackGuard: Automatic Adaptive Detection and Prevention of Buffer-Overflow Attacks", Proceedings of the $7^{th}$ USENIX Security Symposium, Jan. 26-29, 1998, 15 pgs., USENIX Association, Berkeley.
Kiriansky, "Secure Execution Via Program Shepherding", Proceedings of the $11^{th}$ USENIX Security Symposium, Aug. 5-9, 2002, pp. 191-206, USENIX Association, Berkeley.
Lhee, "Type-Assisted Dynamic Buffer Overflow Detection", Proceedings of the $11^{th}$ USENIX Security Symposium, Aug. 5-9, 2002, pp. 81-89, USENIX Association, Berkeley.

(Continued)

*Primary Examiner* — Jeffrey Pwu
*Assistant Examiner* — Helai Salehi (57) ABSTRACT

Mechanisms have been developed for securing computational systems against certain forms of attack. In particular, it has been discovered that, by scanning an input string for subsequences contained therein and configuring the computational system to generate a fault (or other triggered event) coincident with access to a memory location corresponding to one or more possible interpretations of data contained in the input string, it is possible to detect and/or interdict many forms of attack. For example, some realizations may scan for subsequences susceptible to interpretation as valid, canonical addresses, or as addresses in ranges that contain code, the stack, the heap, and/or system data structures such as the global offset table. Some realizations may scan for subsequences susceptible to interpretation as format strings or as machine code or code (source or otherwise) that could be executed in an execution environment (such as a Java™ virtual machine) or compiled for execution.

30 Claims, 6 Drawing Sheets

(56) References Cited

OTHER PUBLICATIONS

Milenković, "A Framework for Trusted Instruction Execution Via Basic Block Signature Verification", Proceedings of the 42nd annual Southeast regional conference, 2004, pp. 191-196, ACM Press, New York.

Newsham, "Format String Attacks", Copyright 2000 Guardent, Inc., pp. 1-6.

Suh, "Secure Program Execution via Dynamic Information Flow Tracking", Proceedings of the 11th international conference on Architectural support for programming languages and operating systems, 2004, pp. 85-96, ACM Press, New York.

Thuemmel, "Analysis of Format String Bugs", Version 1.0, Feb. 15, 2001, pp. 1-15.

* cited by examiner

SECURITY METHOD FOR DETECTING INTRUSIONS THAT EXPLOIT MISINTERPRETATION OF SUPPLIED DATA

BACKGROUND

1. Field of the Invention

The present invention relates generally to computational systems and, more particularly, to security techniques for identifying and (in some cases) interdicting information system intrusions.

2. Description of the Related Art

The vulnerability of computer systems, configurations, software and information codings and protocols to unauthorized access or use is widely recognized, at least by information security professionals. In general, these vulnerabilities can range from minor annoyances to critical national security risks. Today, given the ubiquitous nature of Internet communications and the value of information and transactions hosted on the public internet, vulnerabilities are discovered and exploited at alarming rates. Automated tools facilitate the probing of systems and discovery of vulnerable systems and configurations. Once vulnerabilities are identified, exploits can be globally disseminated and rapidly employed.

Often, exploits seek to compromise security by introducing into a target system, data that can or will be interpreted by the target system in a way that facilitates the attack. For example, one classic form of attack is the so-called buffer overflow attack, in which an exploit causes vulnerable code to write data to memory in such a way that locations beyond the ostensible write target are updated. Typically, the data written takes the form of an input string that includes data which, if successfully introduced into memory in a precise location, will be interpreted by executing code (typically privileged code) in a way that facilitates the exploit. For example, if a write operation improperly writes 2 KBytes of data to a 128 Byte data structure, memory locations may be updated beyond the data structure intended by the original programmer. If those memory locations include the stack or a pointer used by privileged code, an attacker may successfully alter an execution path of privileged code. Other exploits may modify data upon which privileged code relies. In any case, a precisely crafted input string can be used to compromise a computer system.

Vulnerability to such attack vectors generally results from poor programming practices and/or bugs. However, such vulnerabilities are surprisingly widespread in commercial off the shelf software. A majority of the most damaging Internet "worms" have employed techniques that resulted in direct corruption of function-pointers. Two notable examples are the 1988 Morris Internet worm which exploited (amongst other vulnerabilities) an unchecked buffer write in the UNIX fingerd program and the 2003 Slammer worm which exploited a buffer overflow vulnerability in computers running Microsoft's SQL Server.

In general, the strategy (if not the specific vector) of such attacks is reasonably well understood and a variety of security techniques have been developed to detect and/or defeat some such attacks. Examples include stack canary techniques, such as employed in StackGuard™ (or StackGuard-inspired systems) and StackShield extensions to the Gnu C compiler, and constrained control-flow techniques, such described by M. Abadi, M. Budiu, Ú. Erlingsson and J. Ligatti, *Control-Flow Integrity*, Microsoft Technical Report, MSR-TR-05-18 (October 2005) or proposed by V. Kiriansky, D. Bruening and S. Amarasinghe, *Secure Execution Via Program Shepherding*, in Proc. 11th USENIX Security Symposium (2002). However, techniques employed have typically required a binary-rewriting pass or worse, source code analysis.

Alternative techniques are desired.

SUMMARY

Mechanisms have been developed for securing computational systems against certain forms of attack. In particular, it has been discovered that, by scanning an input string for subsequences contained therein and configuring the computational system to generate a fault (or other triggered event) coincident with access to a memory location corresponding to one or more possible interpretations of data contained in the input string, it is possible to detect and/or interdict many forms of attack. For example, some realizations may scan for subsequences susceptible to interpretation as valid, canonical addresses, or as addresses in ranges that contain code, the stack, the heap, and/or system data structures such as the global offset table. Some realizations may scan for subsequences susceptible to interpretation as format strings or as machine code or code (source or otherwise) that could be executed in an execution environment (such as a Java™ virtual machine) or compiled for execution.

Any of a variety of techniques may be employed to configure the computational system to generate a fault or other event that corresponds to one of the interpretations. Servicing of faults (or events) generated coincident with access to particular addresses may include comparison with an appropriate fingerprint (e.g., contents of neighboring memory locations) for indicia that indicate or suggest that use of data from a particular received input string resulted in the fault. In such cases, action (e.g., interdiction, further monitoring, etc.) may be appropriate.

Scanning may be performed at variety of sampling points in a computational system, including by device drivers, listeners and/or handlers for network traffic, I/O service routines, using hardware, at communication interfaces or gateways, etc. Filtering may be employed to limit fault coverage and use of computational and fault handling resources. For example, in some realizations, information regarding receive port, originating source, level of traffic, time of day, user account or recipient, etc. may be employed. Aging of scanned-for subsequences and/or fingerprints may be employed in some realizations. Statistical techniques may be employed to correlate or otherwise establish similarity of a context or situation with others known to be dangerous or benign.

These and other variations will be understood with reference to this specification and the claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Mechanisms have been developed for configuring an intrusion detection system to identify possible exploitations of data identified in inputs. In particular, techniques have been developed for identifying subsequences susceptible to malicious exploitation in the course of a given computation and for configuring the computation (or computational system) to trigger an evaluation and/or response when certain execution conditions suggest use of data or code implicated by the identified subsequences. The developed techniques are particularly effective against exploit strategies employed by some of most devastating Internet worms from 1988 to present.

The method(s) by which we discover an attack differ(s) significantly from conventional intrusion detection methods, which typically scan for signatures or require examination of source or binary code prior to execution. Instead, we identify data in input streams that could be misinterpreted (or maliciously exploited) and take specific steps to react to such misinterpretations (or exploits) if and when they occur. In this sense, our techniques are data-centric, rather than code-centric. Our techniques can be employed to allow most modern CPUs to execute all the binary code in the system without examination of the binaries or corresponding source codes. We employ advanced but now-commonplace hardware features to transfer control to trusted code if certain "suspicious" or "dangerous" actions are taken during the execution of the original code. Our techniques are applicable to exploits that involve operating system code as well as applications.

For concreteness, we describe implementations based on facilities, terminology and exploits typical of certain processor architectures and systems, and based on terminology and exploits typical of certain operating systems, virtualization systems and network protocols and/or services. That said, our techniques are general to a wide variety of processor and system architectures (including both single- and multi-processor architectures based on any of a variety of instruction set architectures), to numerous operating system implementations and to systems in which hardware may or may not be virtualized. In general, our techniques may be implemented in an operating system, in a virtual machine layer, in hardware (or device firmware or drivers) or combinations of the foregoing. In realizations implemented in hardware and/or in a virtualization system, existing operating systems may run unmodified. In general, our techniques do not require modification or recompilation of the code that is vulnerable to an exploit.

Accordingly, in view of the foregoing and without limitation on the range of underlying processor, hardware or system architectures; operating systems; or virtualization techniques that may be employed in realizations of the present invention, we describe our techniques primarily in the context of certain exemplary realizations. Based on these exemplary realizations, and on the claims that follow, persons of ordinary skill in the art will appreciate a broad range of suitable implementations and exploitations.

Exploits, Generally

In general, our techniques address many of the unwelcome side-effects of buggy or poorly-coded software that handles input strings. These side-effects, which can often be exploited in an attack, include:

Direct function-pointer corruption;

Direct data-pointer corruption; and

Imminent indirect data retrieval, corruption, or transmission via the introduction of misinterpreted data.

By function pointer we mean any pointer to code. In this sense, a branch target or return address is a type of function pointer. By "direct corruption" we mean that part or all of the information in an input string is copied (possibly after several intermediate copies) or otherwise written directly into a register, memory cell, or other storage, that was not intended to store any part of the input string at that time. This definition encompasses "buffer overrun" attacks, amongst others.

Direct Function—Pointer Corruption

Historically, the majority of the most damaging "worms" have exploited this form of attack. The Morris Internet worm from 1988 and the more recent Slammer worm are two examples, and based on the description herein, other similar exploits will be understood by persons of ordinary skill in the art. Our techniques can be employed to detect direct function-pointer corruption attacks in which the corrupted pointer is not modified between its corruption and its use for control-flow. In practice, corrupted pointers are seldom modified prior to use.

Direct Data—Pointer Corruption

It is also undesirable to allow attackers to directly corrupt data pointers. Examples of exploits in which a data pointer is directly corrupted to later gain control of an application are well known and based on the description herein, will be understood by persons of ordinary skill in the art. One notable example was published as *Bypassing StackGuard and StackShield*, by Bulba and Kil3r, in Phrack Magazine, Volume 10 [0xa] Issue 56 [0x38] (May 2000). Our techniques can be used to detect such attacks wherein the corrupted pointer is used before being modified. As before, corrupted pointers are seldom modified prior to use.

Indirect Data Retrieval/Corruption/Transmission

The classes of attacks summarized above generally build upon an input string that is misinterpreted because, contrary to programmer's intent, part or all of it is copied to an inappropriate place in the computer. For example, a return address on the stack can be overwritten by a string and a later machine instruction might then interpret part of that string as a code address. Of course, while such a sequence may be contrary to the intent of the operating system or application programmer, it can be exactly what a hacker intends.

It is also possible for bugs to allow data to be "misinterpreted" even when in an expected place in the computer. For example, some programs sloppily interpret a string as a set of formatting instructions when it is unsafe to do so; this class of vulnerabilities is sometimes called "format string vulnerability." Other programs may be exploited to execute a script, command or code specified by a string, typically at an inappropriate level of privilege.

Computational Systems, Generally

Figure 1:
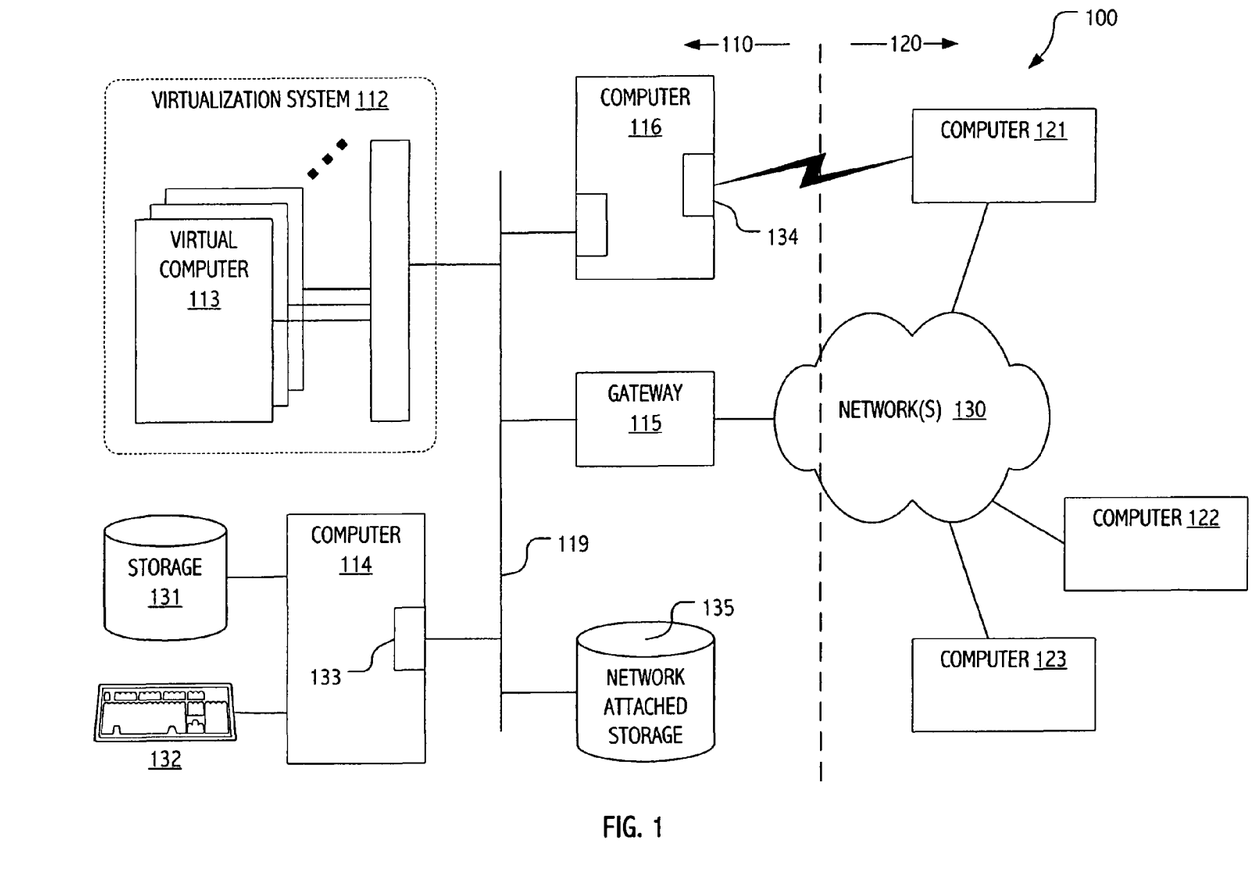
FIG. 1 depicts a network of computer systems in which techniques of the present invention may be employed.

FIG. 1 depicts a network in which techniques of the present invention may be employed to secure any of a variety of computational systems against exploits such as described above. In particular, FIG. 1 illustrates a networked system 100 in which a collection of computational systems 110 interface with external and potentially untrusted computers 121, 122 and 123. In the illustrated configuration, an important source of input strings that may contribute to an exploit is the set of untrusted computers 121, 122 and 123 and users. However, more generally, exploits may come from other sources including computational systems, storage and devices inside a corporate firewall or local to a targeted machine. In general, computers 121, 122 and 123 and network(s) 130 are representative of any of a variety of systems and networks (and combinations thereof), local or globally distributed, that may supply information to a computational system via any of a variety of communication channels and/or protocols, including (but not limited to) those generally associated with the Internet. Eventually, such information is presented to one or more of the illustrated computational systems 110 as an input string.

While we refer generally to such information as an input string, the data thereof need not be coded in any particular format. Indeed, we use the term input string merely to identify a sequence of codes, symbols, characters, numbers supplied (or received) as an input to a computational system. In particular, the term input string should in no way be construed as limited to any particular format, e.g., to sequences of ASCII character codings. Similarly, persons of ordinary skill in the art will understand that information is often supplied (or received) encapsulated in packets or other information bearing units and coded/modulated/stored/represented in forms suitable to a particular transmission medium, storage form, etc. and is routinely decoded, transcoded, assembled, packetized, quantized, etc. in the course of manipulation and/or transfer. Therefore, the term input string is meant to represent information content as eventually presented to a computational system without regard to any particular information coding, modulation, storage form, data representation etc. In particular, the information content of an "input string" may at times span multiple packets, coding units, buffers, etc., particularly enroute to memory or a targeted computational system. In the discussion that follows, we refer to subsequences contained in an input string and data (and interpretations of data) contained in an input string. As with "input string," these terms do not imply any particular information coding, modulation, storage form or data representation.

While many attack vectors originate from outside a local (and potentially trusted) network such as the network of computational systems 110, it is important to note that local systems, devices, storage and users may also constitute sources of input strings that constitute or contribute to an exploit. As a result, embodiments in accordance with the present invention may be concerned with input strings that are sourced from a local device (e.g., keyboard 132, network interface 133, modem or other communication device 134, etc.), local stores (e.g., local storage 131 or shared memory), networked devices (e.g., network attached storage 135 or storage area networks), and other computational systems, including those down the hall and across the globe.

Techniques of the present invention will be understood in the context of conventional hardware-oriented embodiments of these and similar systems and devices. However, in addition, we note that computational systems may be embodied as virtual computers 113 presented or emulated within a virtualization system such as virtualization system 112 executing on underlying hardware facilities. Virtualization systems are well known in the art and include commercial implementations, such as VMware® ESX Server™, VMware® Server and VMware® Workstation, available from VMware, Inc., Palo Alto, Calif. and operating systems with virtualization support, such as Microsoft® Virtual Server 2005, and open-source implementations such as available from XenSource, Inc.

Some advantages of virtual machine technology have become widely recognized in the art. Amongst these advantages is the ability to run multiple virtual machines on an underlying hardware platform. Server consolidation exploits this advantage in an attempt to make better use of the capacity of the underlying hardware, while still ensuring that each user enjoys the features of a "complete" and apparently isolated computer. Depending on how a particular virtualization system is implemented, it can also provide greater security since the individual virtual machines can isolate potentially unstable or unsafe software so that it cannot adversely affect the hardware state or system files required for running the physical (as opposed to virtual) hardware. Although certain virtualization particular strategies/designs are described herein, virtualization system 112 is representative of a wide variety of designs and implementations in which underlying hardware resources are presented to software (typically to operating system software and/or applications) as virtualized instances of computational systems that may or may not precisely correspond to the underlying physical hardware.

Thus, computational systems in (or for) which techniques of the present invention may be employed include traditional systems (such as computers 114 and 116), virtualized systems (such as virtualization system 112 and presented virtual computers and/or virtual machines 113) and/or combinations of the foregoing. In addition, functionality described herein may be distributed across devices or systems. For example, scanning of input strings may be performed upstream (in a data transfer sense) of a targeted system, e.g., at a gateway such as gateway 115 or computer 116. In some exploitations, a virtualization system can be employed to provision a virtual computer (e.g., as "host" for a gateway device or virtual appliance).

These and other exploitations will be understood with reference to the description that follows. We now turn to certain exemplary scanning and exception handling techniques.

Scanning Inputs for Subsequences Susceptible to Exploitation

Computational systems such as illustrated above typically receive inputs that are eventually stored in memory and/or presented to programs (including operating system software and/or application programs) executing within the computational system. In general, such input strings may be received via any of a variety of communication channels, device interfaces or data transfers. For example, some input strings may be received at a network interface card (NIC) and eventually transferred into memory of a computational system using techniques such as DMA. Other input strings may be received or accessed from data storage devices (such as disk, tape or other media) or from other storage (such as shared memory of device memory) or other I/O devices such as a keyboard devices, modems, USB devices, etc.

For purposes of the present invention, input strings may arrive from nearly any source and via nearly any path. Those input streams may contain (or encode) subsequences suitable for use in an exploit. Of course, subsequences may encode legitimate data that is not part of any attack or exploit and which will never be misused or misinterpreted. In general, for at least some of the kinds of subsequences of interest to us, it will not be possible to distinguish a priori between an innocuous subsequence and one that will later be employed in an exploit. For this reason, we have developed a strategy of identifying subsequences of interest and instrumenting a computational system to detect their inappropriate use. We illustrate a few scenarios in the context of FIG. 2.

In each case, we select a suitable sampling point along the path. Often the suitable sampling point resides in device driver or DMA handler software or in the implementation of a protocol stack or in a virtualization layer corresponding to any of the foregoing. In operating system or application software realizations, sampling points may be provided using input processing facilities of the operating system or application itself. Nonetheless, because it is typically the operating system and applications that we seek to protect from exploits, it will often be preferable to sample using other facilities.

Figure 2:
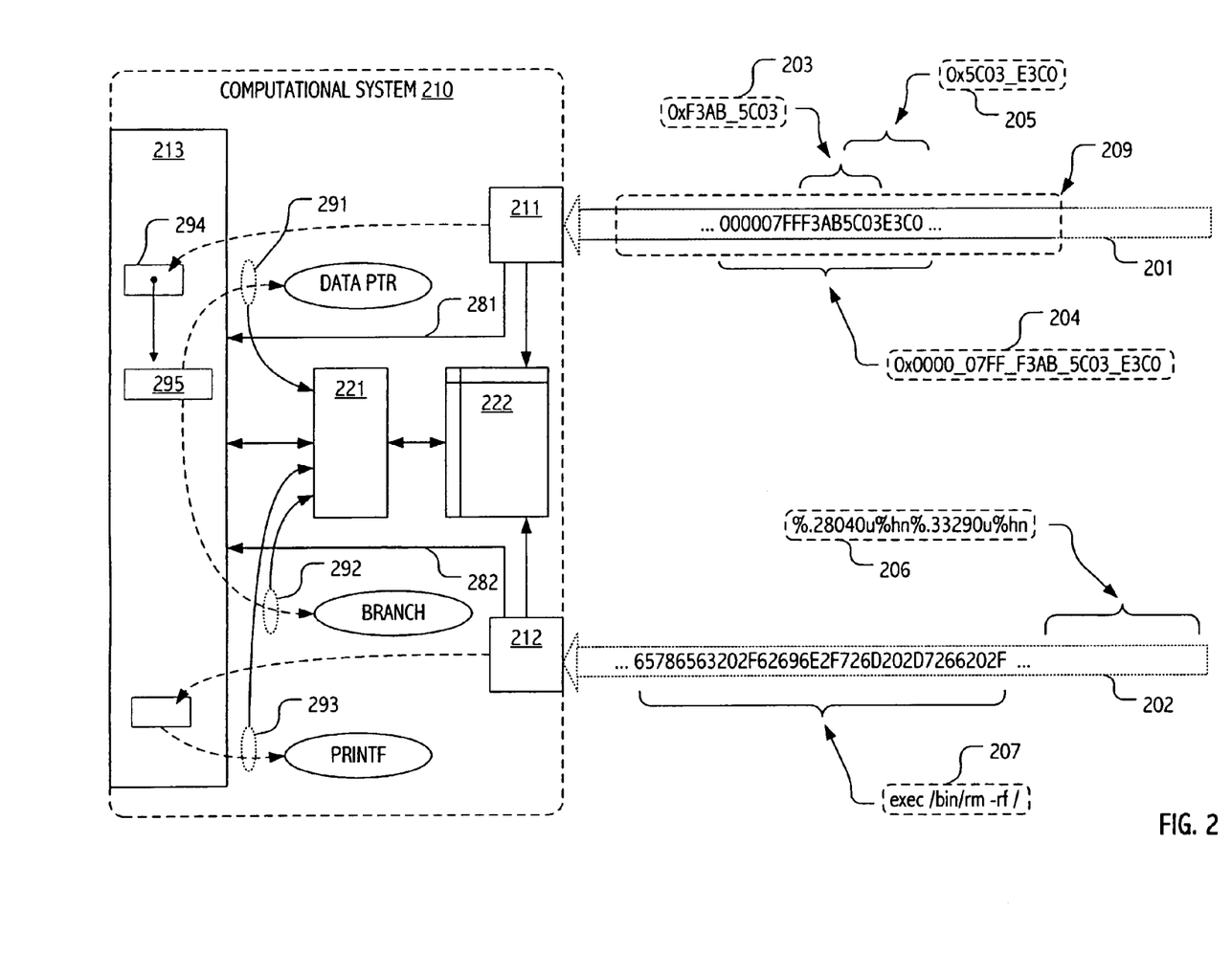
FIG. 2 illustrates the flow of input data bearings subsequences that may constitute or contribute to an intrusion attempt.

For simplicity of description, we illustrate two sampling points in FIG. 2. First sampling point 211 is representative of any suitable sampling point along a data path via which network data is transported to memory 213 accessible to a vulnerable program. Similarly, second sampling point 212 could be any suitable sampling point along a data path via which I/O data (e.g., data received via a keyboard interface or read from a file system) is transported to memory 213. FIG. 2 illustrates the flow of input data bearing subsequences that may constitute or contribute to an intrusion attempt.

Sampling techniques recognize potentially dangerous subsequences that might be used in an exploit. For example, we may consider subsequences that could be interpreted as a pointer as potentially dangerous, or we may consider as potentially dangerous those subsequences that could be passed to a program that executes scripts or commands or passed to a function as a format string. Since, in general, data may be interpreted in a variety of ways and the potentially dangerous subsequences may turn out be innocuous, we do not interfere with normal information flows. Instead, we note certain characteristics of the potentially dangerous subsequence and configure our computational system to recognize its inappropriate use.

In particular, when a potentially dangerous subsequence is identified, a store 222 of "current threat" subsequences is updated and memory subsystems associated with memory 213 are configured to generate an exception in circumstances consistent with exploitation of the perceived threat. If and when it appears that an inappropriate use may be imminent or in progress, we handle the resulting exception (e.g., using exception handler 221), consult store 222 of "current threat" subsequences and related data (such as fingerprints), and determine whether a security action is required or desirable. Several tangible examples may be useful in explaining the techniques.

Misinterpretation of a "Dangerous Subsequence" as a Pointer

In general, a subsequence may be dangerous because it could be interpreted as a pointer to data or code. Therefore, our techniques may be employed to scan input strings and extract "dangerous" subsequences that can be interpreted as memory addresses. For example, a string of bytes with values 3, 5, 7, and 9 could be interpreted as a four-byte address 0x03050709, as could an ASCII string "03050709." FIG. 2 illustrates an input string 201 from which several subsequences can be extracted which might be interpreted as memory addresses. In particular, subsequences 203, 204 and 205 are all potentially dangerous interpretations of data contained in input string 201. Subsequences 203 and 205 are subject to interpretation as 32-bit addresses, while subsequence 204 is a possible interpretation as a 64-bit address.

While the number of possible interpretations of subsequences as memory addresses may, at first, seem daunting, we note that various filtering techniques can be applied before or after scanning an input string. For example, we can use known techniques to estimate or precisely determine which ranges of addresses contain code, the stack, the heap, and system data structures such as the global offset table. Similarly, by sampling addresses in running code where system calls originate, we can estimate roughly what dangerous sequences could be indicative of a return-to-libc attack. Once we know where the targets of worm-induced control-flow are likely to be, we could discard dangerous-looking sequences that point elsewhere. Alternatively (or additionally), we may limit our focus by not considering those subsequences that bear the hallmarks of literal data. For example, we may choose to ignore possible interpretations (as a pointer) for subsequences that contain a subpart that is characteristic of ASCII text, e.g., subsequences containing 7 or more consecutive bytes with value 32 to 120. Similarly, we may choose to ignore subsequences that correspond to non-canonical addresses, or which correspond to addresses that are otherwise not valid.

For further filtering, we may choose to sample only certain input strings. For example, we may only worry about network ports that are unusually busy (with respect to normal levels on a machine or network), or ports that are receiving unusually long messages, or communication from unlikely sources, or communication from machines that are behaving unusually. Another possible filter would be to ignore a dangerous address if the operating system has already marked that address (or more likely, a corresponding range of addresses) as non-executable, non-writable, non-readable, or some combination thereof.

Other possible filtering techniques include checking to see if code at the suspected address looks "reasonable." Based on one possible definition of "reasonableness," we could check the first several bytes at an address, which corresponds to a potentially dangerous interpretation of a scanned subsequence, for consistency with entries in a table of byte sequences that tend to be at or near the tops of functions. The table could be fixed or dynamic. Other definitions of "reasonableness" could be based on decoding instruction(s) and/or control/data flow analysis.

In general, we can expect that potentially dangerous address subsequences will be exploited soon after they are introduced. Therefore, simply aging and retiring potentially dangerous subsequences from store 222 may sufficiently bound the current set of potentially dangerous interpretations to be tracked. Similarly, if we have previously encountered input strings that led to a clear or likely misinterpretation of data, we can use a history of "similar situations," to guide us.

In any case (with or without filtering), our techniques scan input strings for potentially dangerous interpretations of subsequences. For purposes of illustration, we assume that the potentially dangerous interpretations directly correspond to the subsequences, although more generally, we envision that the potentially dangerous interpretations may include transformations, transcodings, offset calculations, mods, shifts or other indirect interpretations of a given subsequence. In the illustration of FIG. 2, three subsequences are illustrated that may directly correspond to a valid memory address, such as:

0x0000__07ff_F3ab__5c03_e3c0,
0xf3ab__5c03, or
0x5c03_e3c0.

For purposes of illustration, we assume that, based on factors such as described above, one of the address interpretations is potentially dangerous.

We update store 222 of "current threat" interpretations with information descriptive of the potentially dangerous address. Typically, store 222 will include a representation of the address itself, together with sufficient additional information to statistically or circumstantially connect a subsequent use of the address with the source input string. For example, several bytes preceding and/or following the subsequence (in the input string) may be stored for later comparison with a memory footprint.

In addition, we configure (281) subsystems associated with memory 213 to trigger an action if and when memory 295 identified by the potentially dangerous address is accessed. In general, we use any of a variety of techniques, including setting a relevant no-execute bit, unmapping the corresponding memory page, marking a page as non-readable or non-writable, truncating a code segment, truncating a data segment or setting a breakpoint. In each case, we use an appropriate handler mechanism, e.g., an exception, fault, trap, interrupt, breakpoint or other handler (shown generally as exception handler 221) to evaluate the likelihood that a particular exception 291, 292 (i.e., a particular exception, fault, trap, interrupt, breakpoint or other event) was caused by a dangerous interpretation of a previously received input string.

As illustrated in FIG. 2, exception handler 221 may consult stored characteristics (e.g., a fingerprint that includes several bytes preceding and/or following the subsequence in the input string) to estimate the likelihood that use of data from input string 201, including the dangerous subsequence or interpretation, actually triggered the exception. Using techniques described in greater detail below, exception handler 221 determines whether a pointer 294 that is used as a pointer to data or as a call/branch/return target (at location 295) constitutes an interpretation of a dangerous subsequence sourced from input string 201.

FIG. 2 also illustrates analogous techniques for extracting dangerous subsequences that may be interpreted as code or script (207) or a format string (206). As before, we update store 222 of "current threat" interpretations with information descriptive of the potentially dangerous interpretation and configure the computational system to trigger an action under circumstances that could constitute or contribute to an exploit. Since, in the case of a conveyed code or format string vulnerability, it is typically some code that is vulnerable, we configure the computational system to trigger an exception if and when potentially vulnerable code is executed. For example, in the case of a current threat posture that includes a potentially dangerous interpretation of an input subsequence as a format string, we may configure (282) the computational system to throw an exception (293) when any system function that employs format strings (e.g., printf, sprintf, snprintf . . . ) is called. We then use an exception handler (shown generically as exception handler 221) to evaluate whether information from the suspect input string has been passed to the function. Similarly, for conveyed code, we configure the computational system to trigger an exception if and when corresponding code (e.g., a shell, a compiler, etc.) is invoked. As before, we use any of a variety of techniques, including setting a relevant no-execute bit, unmapping the corresponding memory page, marking a page as non-readable, truncating a code segment, or setting a breakpoint, to trigger a transfer of control to exception handler 221. Other techniques include instrumenting the code.

Prevention of "Dangerous" Control-Flow and Data Accesses

We will use the abbreviation "VA" to refer to an address. In general, a VA may be a virtual address, a physical address, or some other reference to a storage location. However, in many current computer systems, our techniques will be most naturally applied in the context of virtual addresses and memory subsystems that support virtual memory.

For each sequence determined to be "dangerous," we calculate zero or more VAs which are likely misinterpretations of that sequence. We then can cause any attempt to execute code at those VAs to be detected. Ideally, detection will occur as early as possible, but the invention may still be effective even if detection occurs much later than is theoretically possible. There are many standard approaches to causing execution at a particular VA to be detected, such as setting the relevant no-execute bit, unmapping the page, truncating a code segment, or setting a breakpoint. Similarly, we can cause any attempt to read or write to those VAs to be detected. For want of a general term, let's call this process "smearing." Define the "smear's VA" as the VA that we considered to be a likely misinterpretation when creating the smear. Define the smear's "dangerous sequence" as the sequence of bytes and the input string which led us to create the smear because they could be interpreted as the smear's VA.

We will use the generic term "exception" for the process by which a computer transfers control from a smeared program to our invention's trusted code upon detection of one of the aforementioned conditions. Various computer manufacturers use "page faults," "exceptions," "traps," "interrupts," "breakpoints," or other terminology.

In addition, we record a portion of the input string near the dangerous sequence as the "fingerprint" of the smear. For example, in some realizations, we record a fingerprint that includes a smear's dangerous subsequence plus 16 bytes on either side. In general, any descriptive information by which we may determine (or establish to some statistical probability) that a later use of data which includes the smear's dangerous subsequence is directly or indirectly sourced from the input string is suitable Fingerprints need not be a contiguous substring of an input string.

Presumably new smears will be desirable from time to time, so to preserve decent performance we'll have to discard old smears. For stack-smashing attacks a smear usually doesn't need to live long to do its job. A thousand CPU cycles of processing by an attacked application program may be enough for a worm to gain control because a return address was just overwritten. In general, any amount of time may pass before the worm gains control, but usually the worm affects control flow at one of the next few "return" instructions, and our techniques will detect it then.

What if an Exception Occurs while at Least One "Smear" is Present?

If an exception occurs while at least one "smear" is present, we determine if the presence of the smear could have caused the fault. If yes, we continue. If no, we allow exception handling to proceed normally.

We determine the address of the instruction (AI) that the computer was attempting to execute or fetch and estimate the location of the last completed instruction or control-flow-free block of instructions (LCI). On most modern computers these data are available from hardware registers (e.g., the LastExceptionFromIP register).

For each smear whose VA equals AI:
Invoke ExecutionHit (smear, AI, LCI) if the attempt to fetch the instruction at AI led to the fault.
Invoke DataHit (smear, AI) otherwise.
For each other smear that could have caused this exception but whose VA is not AI, we have a "false hit."
Execution Hit We can handle several cases in ExecutionHit (smear, AI, LCI). Not all are necessarily practical on all types of hardware.
Case 1: The last completed instruction got AI from memory and the computer tried to execute an instruction at AI as a result. Examples: ret, indirect call/jmp that reads memory.
Case 2: An instruction prior to the last completed instruction got AI from memory, and we can determine or guess where that memory is. Example: "mov (% r9) to % r8; call *% r8."
Let C be the number of addresses from which the processor read or probably read the value AI recently. If C is zero then treat this as a "false hit." Otherwise, for each such address, X, estimate the probability that strong action should be taken based on factors which, in some implementations, include:

How reliable is the smear in question.

How closely does the fingerprint of the smear matches the region of memory at address X.

User-specified or computed estimates of overall worm activity at present.

User-specified or computed estimates of recent worm attack rates via strings similar to the smear's input string or via modes of communication that are consistent with this smear.

Computational load, network load, process-creation rate, system-call rate, or other measures of hardware and operating system activity.

The value of safety (versus speed) in the operation of this computer.

Similarity of this situation to previous situations with known outcomes.

Based on these criteria (and possibly others), go to either WormExecutionLikely( ) or WormExecutionPossible( ). In general, suitable actions will be system and/or deployment dependent; however, a few illustrative examples are provided below.

Possible Worm:

Numerous "just-in-case" countermeasures are possible in an implementation of WormExecutionPossible( ) including escalating a security posture, initiating logging, notifying a sysop, etc. Alternatively, at least under low-threat postures, it may be reasonable to take no action. In some situations, it may be desirable to take a snapshot of the current state before continuing execution or to deploy a honeypot. Typically, after countermeasures, if any, have been taken, we continue as in the "false hit" case. However, an additional possibility is to keep running but go to WormExecutionLikely( ) if the next system call looks suspicious.

Probable Worm:

In situations in which our techniques suggest that worm execution is likely, there are a variety of possible responses. For example, in some situations, an implementation of WormExecutionLikely( ) may interdict by supplying the triggering thread/process (or in the case of virtualization system realizations, the guest operating system) an undefined-instruction fault, or by terminating the process, application or service believed to be buggy, or by taking some other user-specified action. Other less drastic responses may include notifying the user via GUI, email, pager, log file, and/or other mechanism. In some realizations, WormExecutionLikely( ) may disable, lockdown or warn other hardware or software that an attack is underway. Indeed, a honeypot that automatically warns others is one potential application of our techniques.

Data Hit

The simplest case for DataHit (smear, AI) is if the reason for reading or writing the smear's VA is that the smear's VA has recently been read from memory or other storage and the surrounding vicinity of memory or storage is similar to the smear's fingerprint. Failing that, it would be suspicious if the data at or near the smear's VA resembles a non-trivial subsequence of an input string. Less clear situations are possible, as in the ExecutionHit( ) case. As before, we trigger an appropriate response, e.g., either WormExecutionLikely( ) or WormExecutionPossible( ), based on system and/or deployment dependent factors.

What if we Get a False Hit?

There are a number of possible responses to a false hit, including no response at all. For example, for a smear that could have caused a current exception, but for which the corresponding VA is not the AI, we can undo the relevant smear(s) so that we can make progress, execute instructions for a while (or as little as one instruction), and then restore the smear or retire it. A number of factors can be considered in any decision, including age, whether jumping to the smear's VA would fault and the number of times or rate at which it has yielded false hits.

Virtualization System Embodiments

As described elsewhere herein, techniques in accordance with the present invention may be exploited in various hardware and software embodiments, including those in which device driver/handler and/or operating system support is adapted to perform the described methods. Nonetheless, as also described herein, virtualization systems present an attractive implementation framework. In particular, in implementations or deployments where use of "off-the-shelf" applications, operating systems and/or device interfaces is important or desirable, virtualization techniques may be adapted to introduce the desired input scanning and event triggering/handling functionality without modifications to operating systems and/or device interfaces.

Figure 3:
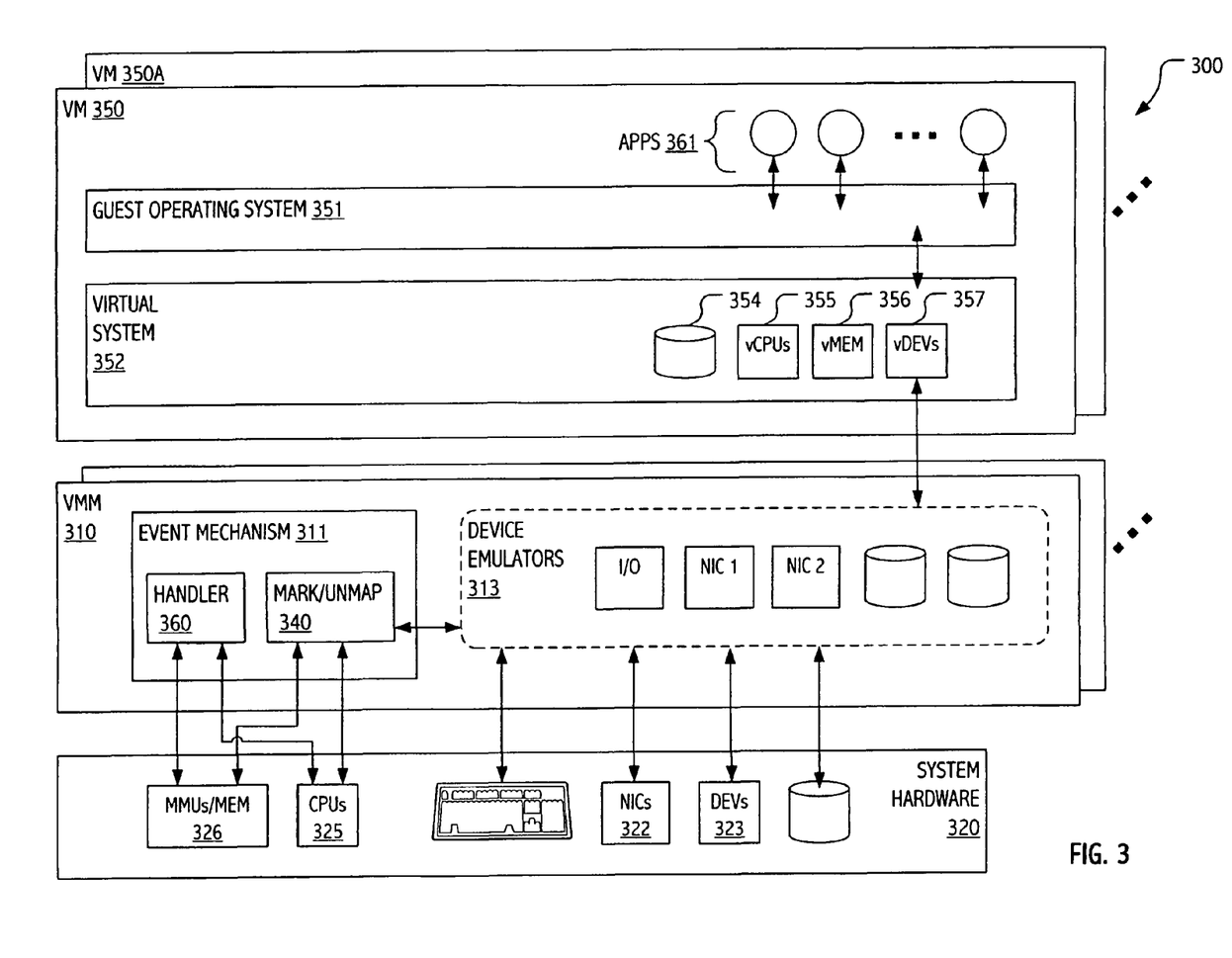
FIG. 3 is a functional block diagram of a virtualization system in which security techniques in accordance with the present invention may be employed.

FIG. 3 is a functional block diagram of a virtualization system 300 in which security techniques in accordance with some embodiments of the present invention may be employed. Plural instances of virtual machine (e.g., VM 350, VM 350A) execute on underlying system hardware 320 in coordination with respective virtual machine monitors, VMMs 310. In the illustrated configuration, each virtual machine supports execution of a guest operating system by presenting a virtual system which, though at least partially emulated using software computations, appears to a guest to be a physical system. In particular, virtual machine 350 (operating in conjunction with functionality of a corresponding VMM) presents a virtual hardware system 352 to guest operating system 351, including software virtualizations of storage, processors, memory and devices (e.g., disk storage 354, vCPUs 355, vMEM 356 and vDEVs 357).

Numerous virtualized devices 357 are typically supported. In many cases, virtualized devices correspond to facilities provided by underlying hardware. For example, virtualizations of network interface (NIC) devices, I/O devices, and storage devices will typically be provided using corresponding underlying hardware facilities. In some cases, a virtual device may correspond precisely to a hardware device. However, correspondence need not be one-to-one. For example, M network interface card (NIC) virtualizations may, in general, be supported using N underlying hardware NICs, wherein M need not equal N. Furthermore, the interface presented to guest operating system 351 (as part of virtual system 352) need not precisely correspond to that provided by underlying hardware. For example, a virtualized device (e.g., a virtualization of a particular MBit Ethernet card) and underlying hardware that supports data transport (e.g., a particular FDDI card) may present very different interfaces. Furthermore, in some cases, a virtualized device need not correspond to hardware of any similar type. For example, in some realizations, a disk device may be emulated using shared memory.

Whatever the characteristics of a particular set of virtualized devices, software that implements the virtualization represents an attractive layer in which to perform the above-described sampling of input strings. Therefore, in certain virtualization system embodiments in accordance with the present invention, sampling points (e.g., sampling points 211 and 212, see FIG. 2) may be introduced at any convenient point in data flows from underlying hardware to operating system and application software. Based on the identification of a dangerous subsequence, we set up an appropriate action triggering mechanism using facilities of underlying hardware CPUs 325 and/or memory subsystems 326. In general, mark/unmap facilities 340 of event mechanism 311 record descriptive information (e.g., as table 222, see FIG. 2, which may be defined in storage of memory subsystem 326) for later use in detecting actual use of a dangerous subsequence. In the illustrated configuration, mark/unmap facilities 340 of event mechanism 311 also configure the computational system to throw an exception (e.g., exceptions 291, 292 and 293, shown in FIG. 2) in situations that may correspond to the use of a dangerous subsequence. As before, we use any of a variety of techniques, including setting a relevant no-execute bit, unmapping a corresponding memory page, truncating a code segment, or setting a breakpoint. In the illustration of FIG. 3, mark/unmap facilities 340 configure memory subsystems 326 and/or CPUs 325. Typically, existing handler mechanisms (e.g., page fault handlers, exception handlers, breakpoint handlers, etc.) otherwise provided for memory management and/or debug may be augmented to include code (or control transfers to code) implementing the functionality described herein.

In the illustrated configuration, corresponding handlers (e.g., handler 360) are defined as part of event mechanism 311 to check for actual use of the dangerous sequence. As before, the event handler may check neighboring memory locations for presence of additional data (e.g., a fingerprint) that correspond to (or correlate with) the input string that included the dangerous subsequence. As previously described, the event handler may evaluate data sources employed by previously executed instructions to identify situations in which an exploit (or worm) is likely active.

Interplay Between Scanning and Detection

In the preceding material, we have described certain exemplary detection strategies and possible implementations, including some that exploit facilities of virtualization systems and underlying hardware mechanisms. Recognizing that the selection of any particular hardware and software environment is largely a matter of design choice, we now review functionality of some realizations without particular regard to any particular hardware/software architecture. In this regard, FIG. 4 includes flowcharts illustrating operation of certain intrusion detection and/or response mechanisms in accordance with some embodiments of the present invention.

Figure 4:
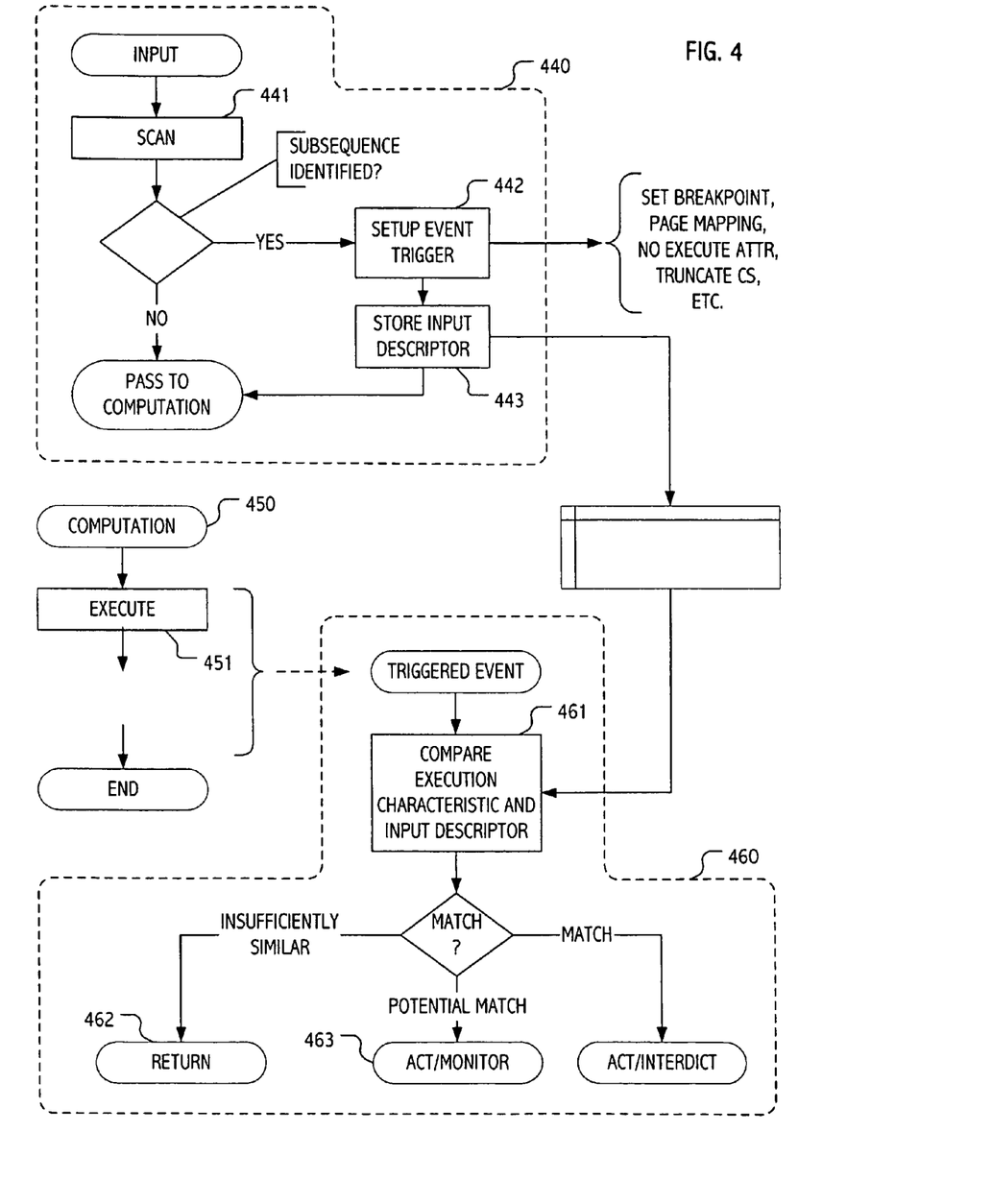
FIG. 4 includes flowcharts illustrating operation of certain intrusion detection and/or response mechanisms in accordance with some embodiments of the present invention.

Flow 440 illustrates a portion of our basic technique. Input arrives from some source destined for some computation. The inputs are scanned (441) and eventually passed to the computation. In general, we scan the inputs to identify subsequences of interest therein; however, in the illustrated flow, we pass inputs to the computation whether or not an interesting (or dangerous) subsequence is identified. In this regard, scanning need not be implemented on a critical information flow path. Indeed, in some realizations, scanning may be performed asynchronously with respect to the basic information transfer.

If an interesting (or dangerous) subsequence is identified, we setup (442) an event trigger for later use in evaluating a targeted subset of execution behaviors of the computation. We also store (443) an input descriptor for later use in the evaluation. Any of a variety of descriptors may be suitable depending on the security threats/vulnerabilities of concern; however, in general, we have selected descriptors that may be used to make simple comparisons with state(s) of the computation or data accessible thereto in an effort to establish to a high degree of statistical probability that a triggering event is (or is not) causally linked to use (in the computation) of the previously identified dangerous sequence. As previously described, any of a variety of event triggering mechanisms may be employed.

Building on our techniques, computation 450 (typically defined by application or operating system software, or by an applet, routine or other component thereof) is executed (451) without modification to the software. At some point during execution of the computation, a diagnostic/response flow 460 can be triggered based on the previously set event trigger. Typically, flow 460 interrupts execution of the computation pending diagnosis of the triggering event. However more generally, flow 460 may be asynchronously triggered in certain situations. In any case, we compare (461) an execution characteristic with one or more previously stored input descriptors. If the execution characteristic and an input descriptor are sufficiently similar (or correlated) so as to indicate (with at least sufficient probability) that an exploit corresponding to a previously identified interesting (or dangerous) subsequence is active, flow 460 triggers an appropriate action or interdiction. Other responses, e.g., continuing or returning 462 without action or initiating (463) some appropriate monitoring activity or security escalation, may be appropriate in other circumstances.

Notions of Similarity

Many notions of similarity may be used. For example, for the similarity of two strings, one might consider the minimum number of single-byte insertions and deletions needed to make the strings identical. In general, to estimate whether two situations are similar, one can use standard machine-learning or statistical techniques to cluster data. For example, suppose many previous situations and the two under consideration are clustered into 10 clusters via some such technique. One might then describe the two situations as similar only if they both are assigned to the same cluster.

In order to effectively apply machine-learning or statistical analysis to "situations," it is often useful to construct a vector of characteristics or measurements about each situation. These may include, for example:

a. User-specified or computed estimates of overall worm activity at present.
  b. User-specified or computed estimates of recent worm attack rates via strings similar to a particular string or via a particular mode of communication.
  c. computational load, network load, process-creation rate, system-call rate, or other measures of hardware and operating-system activity.
  d. Time of day.

Creating the Illusion of Unlimited Hardware Breakpoints

Some realizations of our techniques may employ breakpoints. To get good performance one will probably want to use hardware breakpoints (debug registers) as much as possible. Unfortunately, the number of smears (or currently tracked dangerous subsequences) plus the number of breakpoints desired for other purposes may exceed the computer's hardware breakpoint capacity. However, it is possible to emulate a computer with unlimited hardware breakpoints by implementing some breakpoints with software and some with hardware breakpoints. Breakpoints implemented with software can use known techniques such as overwriting instructions in place, binary-translation, code-segment truncation, or page-table manipulation. Persons of ordinary skill in the art will appreciate a wide variety of suitable breakpointing strategies. In general, implementations of our techniques may dynamically switch the implementation of any given breakpoint to optimize performance.

Certain practical and performance factors can be implicated by typical software emulations of hardware breakpoints. For example, consider a situation in which N smears are currently tracked at different places on the same memory page. Assume the computer can handle fewer than N breakpoints. If a smear triggers, is a false hit, and then the system needs to make progress with remaining N−1 emulated breakpoints still in force on the same page, we have several options including:

a. using hardware single-step or step-until-next-branch functionality, if available.

b. emulating instructions or using just-in-time translation to make progress.

c. temporarily removing some smears to make quick progress.

Variations and Extensions

If a smear is associated with a virtual address, and a virtual address is associated with a physical address, then one could disregard or retire a smear, lazily or eagerly, if the latter association changes. In general, smears may be implemented globally, or may be managed on a per-process, per-thread, per-thread-group, per-user, or per-group basis.

Input strings can be processed in various ways to yield further strings to examine for potential misinterpretation. For example, we can reassemble input strings that have been split into pieces. We can undo transformations such as encryption and compression. We can reverse strings or otherwise permute them.

While we have emphasized exploitations of our techniques in situations where we detect the use of a corrupted pointer unless it is modified between its corruption and its use, it is, nonetheless, possible to loosen this restriction somewhat by, for each smear R, optionally creating additional smears whose VAs are slight modifications of R's VA.

In determining whether a smear triggered due to a bug, it may be useful to have access to the history of memory cells' contents, of registers' contents, or of other state. Accordingly, in certain realizations it may be desirable to make "snapshots" of such state or portions thereof from time to time. The timing and level of detail for snapshots may be determined by factors such as:

a. value of safety (versus speed) in the operation of this computer.

b. computational load, network load, process-creation rate, system-call rate, or other measures of hardware and operating system activity.

c. user-specified or computed estimates of overall worm activity at present.

d. rates of firewall, anti-worm, anti-virus, or anti-bug actions, such as the rate of smear creation and retirement.

Sufficiently detailed snapshots may also be used to explore multiple options, automatically. For instance, consider the following sequence:

1) Take an extremely detailed snapshot.

2) Continue execution for some period of time.

3) Take another snapshot.

4) Revert to the state of the system at first snapshot. Change the value of some bit of state.

5) Continue execution and compare what occurs to what happened in step 2.

6) Continue, or revert to the snapshot taken in step 3, or go back to step 4.

Implementations may use this technique to defer, in effect, a decision about whether a smear should be installed, or whether a "hit" is "false," and so forth.

Virtualization System Technology and Variations

As is well known in the field of computer science, a virtual machine (VM) is a software abstraction—a "virtualization"—of an actual physical computer system. FIGS. 1 and 3 illustrate aspects of exemplary virtualization systems in accordance with some embodiments of the present invention. In an effort to emphasize features relevant to the inventive concepts certain aspects of more complete virtualization system implementation have been abstracted.

Some interface is generally provided between the guest software within a VM and the various hardware components and devices in the underlying hardware platform. This interface—which can generally be termed "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms (when used in the art) do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, embodiments of the present invention may be used (and/or implemented) in (or in conjunction with) virtualized computer systems having any type or configuration of virtualization software. Moreover, certain illustrative embodiments in accord with the invention are described and illustrated primarily as including one or more virtual machine monitors (shown as component 310) that appear as separate entities from other components of the virtualization software. This is only for the sake of simplicity and clarity and by way of illustration. Differing functional boundaries may be appropriate for differing implementations. In general, for those embodiments of the present invention implemented in (or in conjunction with) a virtualized computer system, functionality and software components/structures described herein can be implemented any of a variety of appropriate places within the overall structure of the virtualization software (or overall software environment that includes the virtualization software).

In view of the above, and without limitation, an interface usually exists between a VM and the underlying platform which is responsible for actually executing VM-issued instructions and transferring data to and from the memory and storage devices or underlying hardware. Subject to the foregoing, we illustrate a "virtual machine monitor" (VMM), shown as component 310 in a configuration described above. A VMM is usually a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

The VMM usually tracks and either forwards to some form of operating system, or itself schedules and handles, all requests by its VM for machine resources, as well as various faults and interrupts. An interrupt handling mechanism is therefore included in the VMM. As is well known, in the Intel IA-32 ("x86") architecture, such an interrupt/exception handling mechanism normally includes an interrupt descriptor table (IDT), or some similar table, which is typically a data structure that uses information in the interrupt signal to point to an entry address for a set of instructions that are to be executed when the interrupt/exception occurs. In the Intel IA-64 architecture, the interrupt table itself contains interrupt handling code and instead of looking up a target address from the interrupt table, it starts execution from an offset from the start of the interrupt when a fault or interrupt occurs. Analogous mechanisms are found in other architectures. Based on the description herein, interrupt handlers may be adapted to correspond to any appropriate interrupt/exception handling mechanism.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual timers are presented as part of the VM 500 for the sake of conceptual simplicity, in some virtualization system implementations, these "components" are at least partially implemented as constructs or emulations exposed to the VM by the VMM. One advantage of such an arrangement is that the VMM may be set up to expose "generic" devices, which facilitate VM migration and hardware platform-independence. In general, such functionality may be said to exist in the VM or the VMM.

Figure 5:
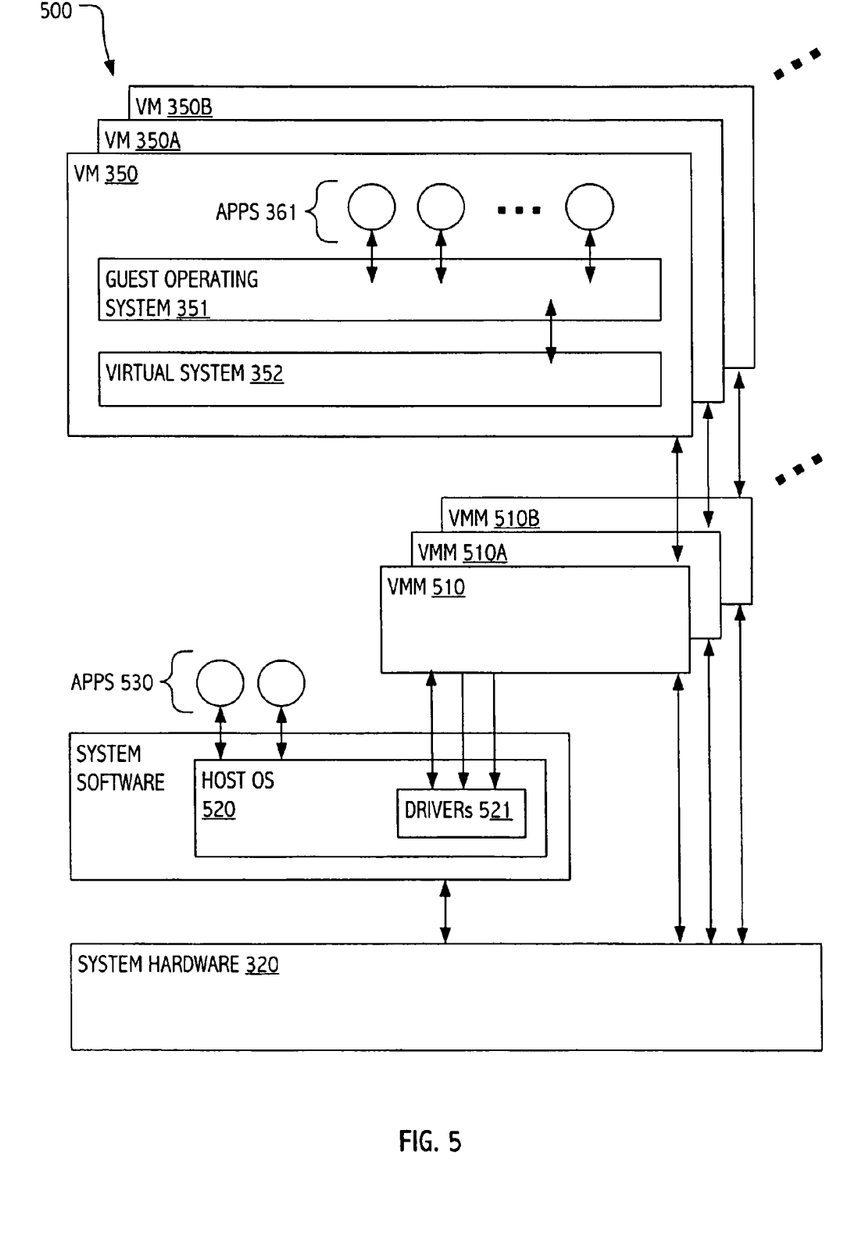
FIGS. 5 and 6 depict functional block diagrams of virtualization system configurations in accordance with respective exploitations of the present invention.
Figure 6:
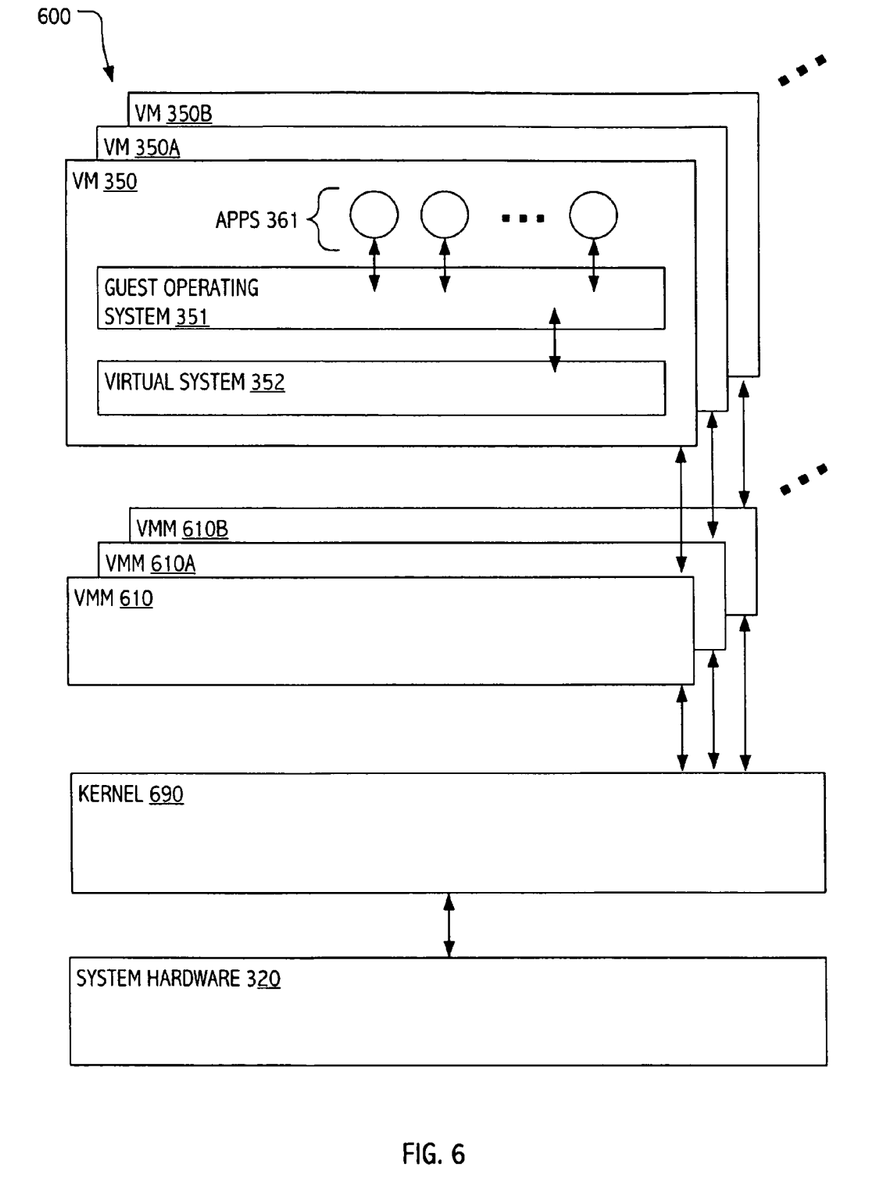

It should be noted that while VMMs have been illustrated as executing on underlying system hardware, many implementations based on the basic abstraction may be implemented. In particular, some implementations VMMs (and associated virtual machines) execute in coordination with a kernel that itself executes on underlying system hardware, while other implementations are hosted by a operating system executing on the underlying system hardware and VMMs (and associated virtual machines) execute in coordination with the host operating system. Such configurations, sometimes described as "hosted" and "non-hosted" configurations, are illustrated in FIGS. 5 and 6. In the hosted configuration, an existing, general-purpose operating system (OS) acts as a "host" operating system that is used to perform certain I/O operations. In the "non-hosted" configuration, a kernel customized to support virtual computers takes the place of the conventional operating system.

Our techniques for scanning input strings for potentially dangerous subsequences and for configuring an exception handling mechanism to evaluate memory accesses and/or code executions for possible use of subsequences sourced from such an input string may be employed in either configuration. Accordingly, in view of the variations, two exemplary virtualization system configurations are summarized and, based on the preceding description, persons of ordinary skill in the art will appreciate suitable hosted and non-hosted implementations of the inventive concepts.

Hosted Virtual Computers

In FIG. 5, we illustrate a virtualization system configuration 500 commonly referred to as a "hosted" virtualized computer system in which a virtual machine monitor (e.g., VMM 510, VMM 510A, VMM 510B) is co-resident at system level with the host operating system 520 such that both the VMMs and the host operating system can independently modify the state of the host processor. VMMs call into the host operating via driver 521 and a dedicated one of the user-level applications 530 to have the host OS perform certain I/O operations on behalf of the VM. The virtual computer in this configuration is thus hosted in that it runs in coordination with an existing host operating system. Virtualization systems that include suitable facilities are available in the marketplace. Indeed, GSX Server® virtual infrastructure software available from VMware, Inc., Palo Alto, Calif. implements a hosted virtualization system configuration consistent with the illustration of FIG. 5. VMware® Workstation desktop virtualization software, also available from VMware, Inc. also implements a hosted virtualization system configuration consistent with the illustration of FIG. 5. VMware and GSX Server are registered trademarks of VMware, Inc.

Non-Hosted Virtual Computers

In FIG. 6, we illustrate a virtualization system configuration commonly referred to as a "non-hosted" virtualized computer system in which a dedicated kernel 590 takes the place of and performs the conventional functions of a host operating system. Virtual computers (e.g., VM/VMM pairs) run on the kernel. Compared with a system in which VMMs run directly on the hardware platform, use of a kernel offers improved performance because it can be co-developed with the VMMs and optimized for the characteristics of a workload consisting of VMMs rather than a more general collection of tasks. Moreover, a kernel can also be optimized for I/O operations and it can facilitate provision of services that extend across multiple VMs (for example, for resource management). Virtualization systems that include suitable kernels are available in the marketplace. Indeed, ESX Server™ virtual infrastructure software available from VMware, Inc., Palo Alto, Calif. implements a non-hosted virtualization system configuration consistent with the illustration of FIG. 6. ESX Server is a trademark of VMware, Inc.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, virtualized computer system-based realizations of the present invention are not restricted to use in systems with any particular "degree" of virtualization and is not to be limited to any particular notion of full or partial ("para-") virtualization.

Other Embodiments

While the invention(s) is (are) described with reference to various implementations and exploitations, it will be understood that these embodiments are illustrative and that the scope of the invention(s) is not limited to them. In general, scanning and event triggering techniques described herein may be implemented facilities consistent with any hardware system or hardware systems hereafter defined. In addition, while our description of virtualization techniques has generally assumed that the virtual machines present interfaces consistent with a hardware system, persons of ordinary skill in the art will recognize that the techniques described may be used in conjunction with virtualizations that do not correspond directly to any particular hardware system. Virtualization systems in accordance with the present invention, implemented as hosted embodiments, non-hosted embodiments or as embodiments that tend to blur distinctions between the two, are all envisioned.

Although achieving a goal of VMM transparency may be facilitated using techniques of the present invention, VMM transparency is not required. Rather, the virtualization system support for power management interfaces and mechanism may be incorporated in so-called "paravirtualization" systems in which a guest operating system is aware that it is being virtualized, and has an explicit interface to the VMM. In such systems, functionality analogous to that described herein as a VMM is sometimes referred to as a "hypervisor."

Many variations, modifications, additions, and improvements are possible. For example, while particular exploits and threat scenarios as well as particular security responses thereto have been described in detail herein, applications to other threats and other security responses will also be appreciated by persons of ordinary skill in the art. Furthermore, while techniques and mechanisms have been described using particular network configurations, hardware architectures, memory organizations and particular operating system constructs (typically IA-32 based architectures/systems and Windows operations systems) as a descriptive framework, persons of ordinary skill in the art will recognize that it is straightforward to modify such implementations for use in systems that support other processor instruction set architectures, other network or memory configurations and/or other operating system constructs.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A security method for a computational system, the computational system including a memory system storing an application, a processor for executing the application, and an input/output system for receiving an input string, the method comprising:
    scanning the input string for subsequences contained therein, wherein each subsequence corresponds to one or more possible interpretations of data contained in the input string;
    identifying one of the subsequences of the input string that can be interpreted as a memory address;
    configuring the computational system to trigger an exception coincident with access to a particular memory location corresponding to the memory address in the identified subsequence;
    allowing the application to execute on the processor and receive the input string; and
    executing a handler routine when the exception is triggered by an access to the particular memory location corresponding to the memory address, the handler being configured to determine whether a security action should be taken and to perform the security action when the security action should be taken.

2. The method of claim 1, wherein the handler routine determines whether the security action is required by evaluating a likelihood that the data contained in the input string caused the particular exception to be triggered.

3. The method of claim 1, wherein at least one of the subsequences corresponds to an interpretation of the data as containing a pointer to the particular memory location.

4. The method of claim 1, wherein the access includes attempting to execute code at the particular memory location.

5. The method of claim 1, wherein the access includes attempting to read from or write to the particular memory location.

6. The method of claim 1, wherein the interpretation is that the subsequence is a memory address within one or more ranges that correspond to code, stack, heap, or a system data structure and the scanning identifies a set of memory locations that correspond to the addresses within the one or more ranges.

7. The method of claim 1, wherein the scanning identifies valid addresses within the input string.

8. The method of claim 1, wherein the input string is filtered based at least partially on a port at which, or source from which, the input string is received, the filtering determining whether the input string is scanned.

9. The method of claim 1, wherein the input string is filtered based at least partially on historical data.

10. The method of claim 1, wherein the configuring of the computation system to trigger the exception includes one or more of setting a no-execute bit, unmapping a corresponding page, marking a page as non-readable or non-writable, truncating a code segment, truncating a data segment, setting a code or data breakpoint and instrumenting targeted code.

11. The method of claim 1, wherein the scanning comprises decrypting, decompressing, reversing, transforming, or permuting the input string.

12. The method of claim 1, wherein:
    the computational system includes a virtualization system, and
    at least some of the scanning is performed by virtualization software running on the virtualization system.

13. The method of claim 1, wherein:
the computational system includes a operating system, and at least some of the scanning is performed at an I/O interface of the operating system.

14. The method of claim 1, wherein at least some of the scanning is performed at an I/O interface of the input/output system.

15. The method of claim 1, wherein:
the computational system includes at least two components separated by a communication channel or network,
the scanning is performed by a first of the components, and
the configuring to trigger the exception is performed by a second of the components.

16. The method of claim 2, wherein the evaluating includes comparing contents of a set of memory locations, including at least some locations generally proximate to the particular memory location, against the data contained in the input string.

17. The method of claim 2, wherein the access includes execution of a control transfer instruction that targets the particular memory location and wherein the evaluating includes:
identifying, based on a last completed instruction or control-flow-free block of instructions, a particular memory location from which the target of the control transfer instruction was read; and
comparing contents of a set of memory locations, including at least some locations proximate to the particular memory location from which the target was read, against the data contained in the input string.

18. The method of claim 2, wherein:
the access includes read or write access to the particular memory location, and
the evaluating includes comparing contents of a set of memory locations, including at least some locations proximate to the particular memory location, against the data contained in the input string.

19. The method of claim 7, wherein the valid addresses are limited to those addresses which correspond to virtual memory in use.

20. The method of claim 7, wherein the valid addresses are limited to canonical addresses.

21. The method of claim 12, wherein at least some of the exceptions that the computational system is configured to trigger are handled by the virtualization software.

22. The method of claim 15, wherein the first component includes or implements a firewall, gateway, router or security appliance.

23. A security method for a computational system, the computational system including a memory system storing an application, a processor for executing the application, and an input/output system for receiving an input string, the method comprising:
scanning the input string for subsequences contained therein, wherein each subsequence corresponds to one or more possible interpretations of data contained in the input string; and
configuring the computational system to trigger an exception coincident with execution of code for which a vulnerability may exist involving a particular subsequence from the subsequences;
allowing the application to execute on the processor and receive the input string; and
executing a handler routine when the exception is triggered by an attempt to execute the code for which the vulnerability may exist, the handler routine being configured to determine whether a security action should be taken and to initiate or perform the security action when the security action should be taken.

24. The method of claim 23, wherein:
one of the interpretations of the content of the particular subsequence contains a format string; and
the exception triggering execution includes attempting to execute a function that accepts a format string as an argument.

25. The method of claim 23, wherein:
one of the interpretations of the content of the particular subsequence contains a functional sequence; and
the exception triggering execution includes attempting to execute code that itself executes, interprets or compiles the functional sequences.

26. The method of claim 24,
wherein the functional sequence includes source or machine code.

27. A machine readable data storage medium, the medium embodying virtualization software for execution on system hardware that includes system memory, a processor, a memory management unit, and a input/output interface, the virtualization software being configured to execute a virtual machine, the virtual machine including virtual system hardware and guest software that includes a guest operating system, and a guest application, the guest software executing on a virtual CPU implemented as part of the virtual system hardware by the virtualization software, the virtualization software further being configured to perform a method comprising:
scanning input strings presented to the virtual machine at a virtualized device interface, the scanning identifying subsequences contained therein, each subsequence corresponding to one or more possible interpretations of data contained in the input string;
identifying one of the subsequences of the input string that can be interpreted as a memory address;
configuring the system hardware to trigger an exception coincident with an access to a particular memory location corresponding to the memory address in the identified subsequence;
allowing the guest system software to execute and receive the input string; and
responsive to the exception being triggered by an access to the particular memory location corresponding to the memory address, determining whether a security action is required and initiating or performing the security action when the security action is determined to be required.

28. The machine readable storage medium of claim 27, wherein the particular memory location corresponds to a stack, heap or system data structure of a virtual machine.

29. The machine readable storage medium of claim 27, wherein at least one of the interpretations is that the subsequence is a pointer; and wherein the access includes one of:
an attempt to execute code at a location in memory referenced by the pointer; and
an attempt to read from or write to a location in memory referenced by the pointer.

30. The machine readable storage medium of claim 27, wherein the virtualized device interface emulates a network interface of a virtual machine and is interposed between the virtual machine and at least one I/O interface of the system hardware.

* * * * *